(12) United States Patent
Sakai

(10) Patent No.: US 7,444,863 B2
(45) Date of Patent: Nov. 4, 2008

(54) THERMAL MASS FLOWMETER

(75) Inventor: Masumi Sakai, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 0 days.

(21) Appl. No.: 11/959,586

(22) Filed: Dec. 19, 2007

(65) Prior Publication Data

US 2008/0148841 A1    Jun. 26, 2008

(30) Foreign Application Priority Data

Dec. 25, 2006    (JP)    ............................. 2006-346953

(51) Int. Cl.
*G01F 1/68*    (2006.01)
(52) U.S. Cl. ................................... 73/204.27
(58) Field of Classification Search ............... 73/204.27, 73/204.26, 204.22, 204.25, 204.18, 204.16; 438/57; 340/603
See application file for complete search history.

(56) References Cited

U.S. PATENT DOCUMENTS 6,813,944 B2 * 11/2004 Mayer et al. ............. 73/204.26

\* cited by examiner

*Primary Examiner*—Jewel Thompson
(74) *Attorney, Agent, or Firm*—Sughrue Mion, PLLC

(57) ABSTRACT

Disclosed is a thermal mass flowmeter, which comprises a heating unit disposed on an outer peripheral surface of a capillary tube, and a pair of temperature-sensing units each provided as a separate component from said heating unit. The temperature-sensing units are disposed on the outer peripheral surface of the capillary tube at respective positions equally distant from the heating unit toward an upstream side and a downstream side of the capillary tube. Each of the temperature-sensing units has a structure in which a temperature-sensing element is covered by a protective resin molded around the temperature-sensing element. The temperature-sensing element consists of a thermistor or a resistance temperature sensor. The temperature-sensing element is disposed to be displaced to a contact surface of the molded resin with the capillary tube relative to a center of the molded resin.

2 Claims, 2 Drawing Sheets

THERMAL MASS FLOWMETER

BACKGROUND OF THE INVENTION

1. Field of the Invention

The present invention relates to a thermal mass flowmeter for measuring a mass flow rate of a fluid flowing through a capillary tube, based on a temperature distribution in a flow direction of the fluid.

2. Description of the Related Art

With reference to FIGS. 2A and 2B, a conventional thermal mass flowmeter will be described. FIGS. 2A and 2B illustrate one example of the conventional thermal mass flowmeter, wherein FIG. 2A is a sectional view showing a measurement site, and FIG. 2B is a graph showing a temperature distribution on a surface of a capillary tube. In FIG. 2B, the vertical axis represents a surface temperature of the capillary tube, and the horizontal axis represents a position of the capillary tube in a flow direction of a fluid. The dashed curve represents a temperature distribution in a state when a fluid in the capillary tube is in a quiescent state (i.e., in a non-flowing state), and the solid curve represents a temperature distribution in a state when the fluid is flowing through the capillary tube (i.e., in a flowing state).

In the measurement site, a heating unit 12 is disposed in contact with an outer peripheral surface of the capillary tube 11. A pair of temperature-sensing units 14, 16 for measuring a surface temperature of the capillary tube 11 are also disposed in contact with the outer peripheral surface of the capillary tube 11 at respective positions equally distant from the heating unit 12 toward a downstream side and an upstream side of the capillary tube 11 along the flow direction. This thermal mass flowmeter employs a flow rate-measuring chip 18 prepared by incorporating the heating unit 12 and the temperature-sensing units 14, 16 into a single substrate using MEMS (Micro Electro Mechanical System) fabrication techniques, wherein the flow rate-measuring chip 18 is mounted to the capillary tube 11 to measure a flow rate of a fluid flowing through the capillary tube 11 (see, for example, U.S. Pat. No. 6,813,944).

In the thermal mass flowmeter, the surface temperature of the capillary tube 11 is measured using the pair of temperature-sensing units 14, 16 disposed in spaced apart relation to each other by a given distance, while locally heating the fluid in the capillary tube 11 up to a given temperature by the heating unit 12 (i.e., while locally heating a wall of the capillary tube up to a given temperature by the heating unit 12). When the fluid is in the non-flowing state, the surface temperature of the capillary tube 11 exhibits a bilaterally (streamwisely)-symmetrical temperature distribution profile having a peak at a position of the heating unit 12, as indicated by the dashed curve in FIG. 2B, and therefore no difference exists between respective measured (i.e., sensed) temperatures of the temperature-sensing units 14, 16 disposed on the downstream and upstream sides relative to the heating unit 12

When the fluid starts flowing through the capillary tube 11, the surface temperature distribution profile of the capillary tube 11 is displaced toward the downstream side in its entirety, as indicated by the solid curve in FIG. 2B, and thereby a certain difference occurs between respective sensed temperatures of the temperature-sensing units 14, 16. More specifically, along with an increase in flow rate of the fluid flowing through the capillary tube 11, the surface temperature distribution profile of the capillary tube 11 is displaced a greater distance toward the downstream side. During this process, as long as the peak of the surface temperature distribution profile is located between the heating unit 12 and the downstream-side temperature-sensing unit 14, the difference between the respective sensed temperatures of the temperature-sensing units 14, 16 becomes larger as the peak position comes closer to the downstream-side temperature-sensing unit 14. That is, on the condition that the peak of the surface temperature distribution profile is located between the heating unit 12 and the downstream-side temperature-sensing unit 14, there exists a certain correlation between the flow rate of the fluid flowing through the capillary tube 11 and the difference between the respective sensed temperatures of the temperature-sensing units 14, 16. This correlation can be figured out in advance to allow the flow rate of the fluid in the capillary tube 11 to be calculated from the difference between the respective sensed temperatures of the temperature-sensing units 14, 16

A low-cost approach to incorporating the heating unit 12 and the temperature-sensing units 14, 16 into a single substrate using MEMS fabrication techniques is hardly achieved due to a problem about required fabrication facilities, etc.

Therefore, there has been proposed a technique of mounting a temperature-sensing unit and a heating unit to an outer peripheral surface of a capillary tube separately so as to make up a thermal mass flowmeter without using MEMS fabrication techniques.

In the type of thermal mass flowmeter having the configuration where a temperature-sensing unit and a heating unit are mounted to an outer peripheral surface of a capillary tube separately, a diode unit is often used as the temperature-sensing unit. The reason is that the diode unit can be driven at a constant voltage to obtain a sensitivity of about 80,000 ppm/° C. which is the highest value among conventional temperature-sensing units. The diode unit is also often used as the heating unit. Typically, in commercially-available diode units, for the purpose of protecting a diode element, a resin is molded around the diode element to allow the diode element to be disposed in a central region of the molded resin. Thus, despite a requirement that a temperature-sensing unit of a thermal mass flowmeter must measure only a temperature change of a target fluid (i.e., a temperature change on an outer peripheral surface of a capillary tube), the diode unit having such a structure will additionally measure an unintended temperature change in its surroundings in such a manner as to be superimposed on a desired sensing signal. Consequently, the unintended temperature change becomes a noise component of the sensing signal to cause deterioration in SN ratio (Signal-to-Noise Ratio) (hereinafter referred to as "S/N").

Moreover, the molded resin of the diode unit is made of an epoxy resin which is not a thermal conductor. Thus, the diode unit used as the temperature-sensing unit or the heating unit will have a delay in thermal response, resulting in a poor response of the thermal mass flowmeter.

SUMMARY OF THE INVENTION

In view of the above circumstances, it is an object of the present invention to provide a thermal mass flowmeter capable of achieving a higher S/N and an enhanced response even in a low-cost configuration where a temperature-sensing unit and a heating unit are mounted to an outer peripheral surface of a capillary tube separately.

In order to achieve this object, the present invention provides a thermal mass flowmeter which comprises: a heating unit disposed on an outer peripheral surface of a capillary tube for allowing a fluid to flow therethrough and adapted to locally heat the fluid in the capillary tube through a wall of the capillary tube; a pair of upstream-side and downstream-side temperature-sensing units each provided as a separate component from the heating unit, and disposed on the outer peripheral surface of the capillary tube on a same side as that of the heating unit and at respective positions equally distant from the heating unit toward an upstream side and a downstream side of the capillary tube; and a calculation section for calculating a flow rate of the fluid flowing through the capillary tube, based on a difference between respective sensed temperatures of the upstream-side and downstream-side temperature-sensing units. In the thermal mass flowmeter, each of the upstream-side and downstream-side temperature-sensing units includes a thermistor or a resistance temperature sensor which serves as a temperature-sensing element, and a protective resin covering the thermistor or the resistance temperature sensor. The thermistor or the resistance temperature sensor is disposed to be displaced to one of opposite outer surfaces of the protective resin, wherein the outer surface of the protective resin located closer to the thermistor or the resistance temperature sensor serves as a contact surface with the capillary tube.

Preferably, in the thermal mass flowmeter of the present invention, the heating unit includes a resistive element serving as a heating element, and a protective resin covering the resistive element. The resistive element is disposed to be displaced to one of opposite outer surfaces of the protective resin, wherein the outer surface of the protective resin located closer to the resistive element serves as a contact surface with the capillary tube.

As above, in the thermal mass flowmeter of the present invention, each of the upstream-side and downstream-side temperature-sensing units includes a thermistor or a resistance temperature sensor which serves as a temperature-sensing element, and a protective resin covering the thermistor or the resistance temperature sensor. Further, the thermistor or the resistance temperature sensor is disposed to be displaced to one of opposite outer surfaces of the protective resin, wherein the outer surface of the protective resin located closer to the thermistor or the resistance temperature sensor serves as a contact surface with the capillary tube. Thus, a sensitivity to a temperature change on the outer peripheral surface of the capillary tube becomes greater than a sensitivity to a temperature change (unintended temperature change) in surroundings of the temperature-sensing unit. This makes it possible to provide a higher S/N of the thermal mass flowmeter.

In addition, a thermal resistance between the temperature-sensing element and the contact surface with the capillary tube can be reduced to provide an enhanced response.

The heating unit may include a resistive element serving as a heating element, and a protective resin covering the resistive element. Further, the resistive element may be disposed to be displaced to one of opposite outer surfaces of the protective resin, wherein the outer surface of the protective resin located closer to the resistive element serves as a contact surface with the capillary tube. In this case, a release of heat generated from the resistive element in directions other than a direction oriented to the capillary tube can be reduced to lower a heat loss. This makes it possible to heat the capillary tube with enhanced efficiency and thereby provide a higher S/N of the thermal mass flowmeter.

In addition, a thermal resistance between the heating element and the contact surface with the capillary tube can be reduced to provide an enhanced response.

These and other objects, features, and advantages of the present invention will become apparent upon reading the following detailed description along with the accompanying drawings.

BRIEF DESCRIPTION OF THE DRAWINGS

FIGS. 1A to 1C illustrate a thermal mass flowmeter according to one embodiment of the present invention, wherein FIG. 1A is a top plan view showing the thermal mass flowmeter, and FIGS. 1B and 1C are a sectional view taken along the line X-X in FIG. 1A and a sectional view taken along the line Y-Y in FIG. 1A, respectively.

FIGS. 2A and 2B illustrate one example of a conventional thermal mass flowmeter, wherein FIG. 2A is a sectional view showing a measurement site, and FIG. 2B is a graph showing a temperature distribution on a surface of a capillary tube.

DESCRIPTION OF THE EXEMPLARY EMBODIMENTS

Figure 1A:
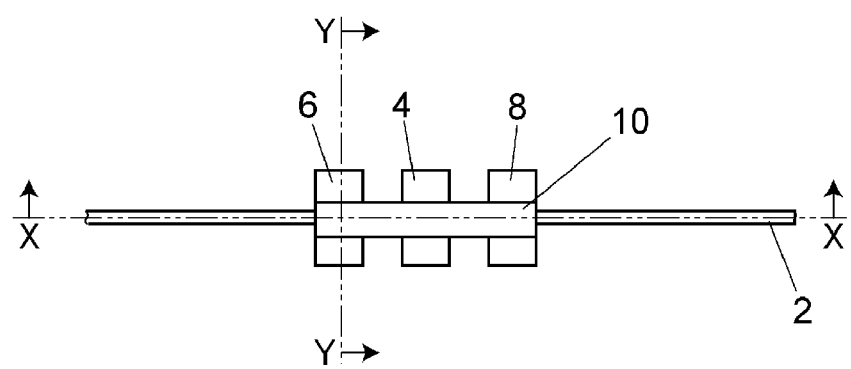
Figure 1B:
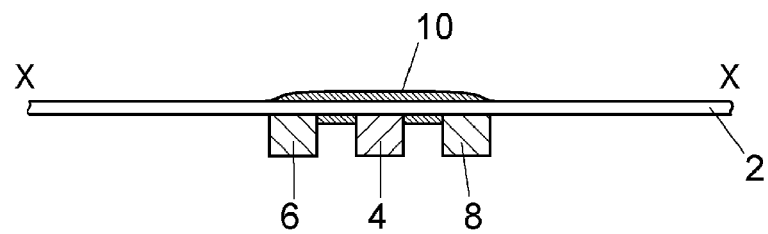

With reference to the accompanying drawings, the present invention will now be specifically described based on an embodiment thereof. FIGS. 1A and 1B illustrate a thermal mass flowmeter according to one embodiment of the present invention, wherein FIG. 1A is a top plan view showing the thermal mass flowmeter, and FIG. 1B is a sectional view taken along the line X-X in FIG. 1A.

As shown in FIGS. 1A and 1B, the thermal mass flowmeter comprises a heating unit 4 and a pair of temperature-sensing units 6, 8. The heating unit 4 is disposed to be in contact with an outer peripheral surface of a capillary tube 2. The heating unit 4 has a structure in which a resistive element serving as a heating element is covered by a protective resin molded around the resistive element, wherein the resistive element is disposed to be displaced to a contact surface of the molded resin with the capillary tube 2 relative to a center of the molded resin.

Each of the pair of temperature-sensing units 6, 8 is provided as a separate component from the heating unit 4. The temperature-sensing units 6, 8 are disposed on the outer peripheral surface of the capillary tube 2 on the same side as that of the heating unit 4 and at respective positions equally distant from the heating unit 4 toward an upstream side and a downstream side of the capillary tube 2. Each of the temperature-sensing units 6, 8 has a structure in which a temperature-sensing element 7 is covered by a protective resin 9 molded around the temperature-sensing element 7 (see FIG. 1C). The temperature-sensing element 7 consists of a resistance temperature sensor or a thermistor. The temperature-sensing element 7 is disposed to be displaced to a contact surface of the molded resin 9 with the capillary tube 2 relative to a center of the molded resin 9. Each of the heating unit 4 and the temperature-sensing units 6, 8 is fixedly mounted to the capillary tube 2 by a thermally-conductive adhesive 10.

Although not illustrated, each of the temperature-sensing units 6, 8 is electrically connected to a calculation section. The calculation section pre-stores an experimentally-determined correlation between a flow rate of a fluid flowing through the capillary tube 2, and a difference between respective sensed temperatures (output signals) of the temperature-sensing units 6, 8, for example, in the form of an analytical curve. The calculation section is operable to calculate a flow rate of the fluid actually flowing through the capillary tube 2, based on a difference between respective actually sensed temperatures of the temperature-sensing units 6, 8, with reference to the pre-stored correlation.

An evaluation on an S/N and a response of the temperature-sensing unit 6 will be described below. While the following description will be made about only the temperature-sensing unit 6, the temperature-sensing unit 8 can be evaluated in the same manner as that in the temperature-sensing unit 6.

Figure 1C:
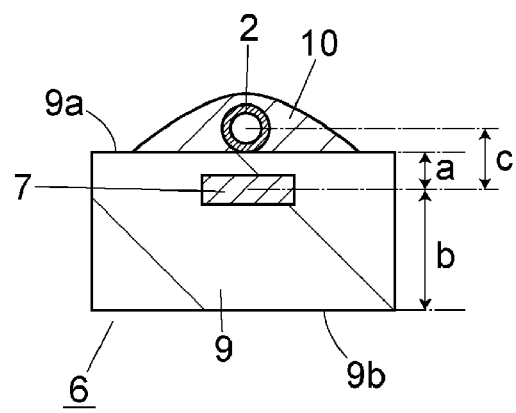
Figure 2A:
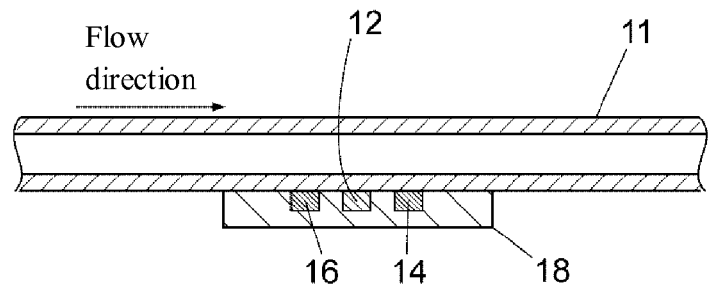
Figure 2B:
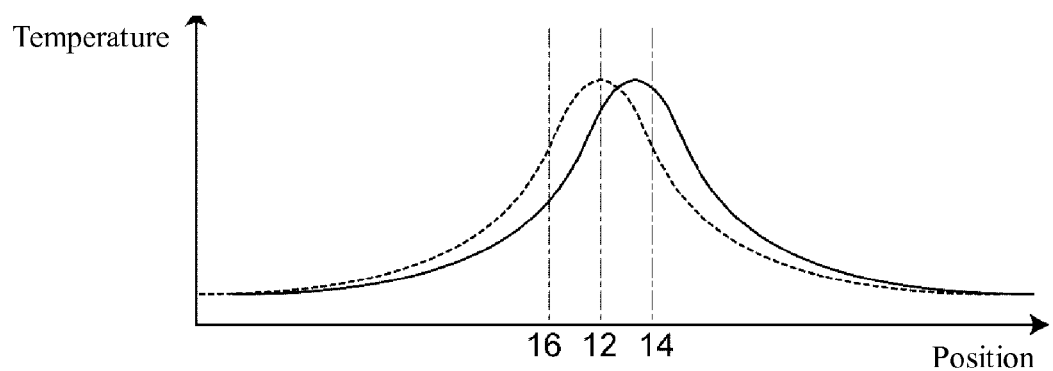

With reference to FIG. 1C which is a sectional view of the temperature-sensing unit 6, only the structure of the temperature-sensing unit 6 will be discussed for the purpose of simplification. Given that a distance between a center of the temperature-sensing element 7 and the contact surface 9a of the molded resin 9 with the capillary tube 2, a distance between the center of the temperature-sensing element 7 and a surface 9b of the molded resin 9 on the opposite side of the contact surface 9a, and a distance between the center of the temperature-sensing element 7 and a center of the capillary tube 2, are "a", "b" and "c", respectively.

A thermal resistance between the temperature-sensing element and the capillary tube 2 becomes smaller as a value of "a" is reduced. Further, a sensitivity of the temperature-sensing unit to a temperature change of the fluid flowing through the capillary tube 2 becomes higher as a value of "c" is reduced. That is, the sensitivity of the temperature-sensing unit to a temperature change of the fluid flowing through the capillary tube 2 can be evaluated by a value of "c".

If a value of "b" is reduced, a sensitivity of the temperature-sensing element 7 to an unintended temperature change in its surroundings will become higher to increase noise. On the assumption that the molded resin has an even thermal conductivity in its entirety, it is desirable for the temperature-sensing unit for use in the thermal mass flowmeter to have a smaller value of "c" and a larger value of "b". The S/N is an intended (desired) signal/an unintended (undesired) signal. Thus, a level of S/N can be simply evaluated based on comparison in terms of a value of "b/c".

As one example of the evaluation, the S/N and the response were evaluated for each of a Schottky diode unit I (a constant current driving type; a=0.26 mm; b=0.34 mm), a Schottky diode unit II (a constant voltage driving type; a=0.26 mm; b=0.34 mm), a thermistor unit (a=0.05 mm; b=0.50 mm), and a resistance temperature sensor unit (a=0.05 mm; b=0.45 mm), and the individual evaluation results were compared with each other. In this comparative evaluation, a capillary tube having an outer diameter of 0.15 mm (radius: 0.075 mm) and an inner diameter of 0.075 mm (radius: 0.0375 mm) was used as the capillary tube 2. Each of the Schottky diode units has a structure in which a Schottky diode serving as a temperature-sensing element is covered by a protective resin molded around the Schottky diode. The thermistor unit has a structure in which a thermistor serving as a temperature-sensing element is covered by a protective resin molded around the thermistor, and the resistance temperature sensor unit has a structure in which a resistance temperature sensor serving as a temperature-sensing element is covered by a protective resin molded around the resistance temperature sensor.

A value of "b/c" was calculated for each of the above temperature-sensing units, as follows.

[Schottky Diode Unit I]

$b/c=0.34/(0.26+0.075)\approx 1.0$

[Schottky Diode Unit II]

$b/c=0.34/(0.26+0.075)\approx 1.0$

[Thermistor Unit]

$b/c=0.50/(0.05+0.075)\approx 4.0$

[Resistance Temperature Sensor Unit]

$b/c=0.45/(0.05+0.075)\approx 3.6$

On the assumption that the molded resin has an even material composition in its entirety, the S/N is determined by a value of "b/c". Thus, an S/N of the thermistor unit is 4 times superior to that of the Schottky diode units I, II, and an S/N of the resistance temperature sensor unit is 3.6 times superior to that of the Schottky diode units I, II.

On the assumption that the molded resin has an even material composition in its entirety, the response is determined by a value of "c". Thus, a response of the thermistor unit is 2.6 times superior to that of the Schottky diode units I, II, and a response of the resistance temperature sensor unit is 2.6 times superior to that of the Schottky diode units I, II In view of the two evaluation items, i.e., the S/N and the response, among the above four temperature-sensing units, the best temperature-sensing unit for the thermal mass flowmeter is the thermistor unit, and the next-best temperature-sensing unit is the resistance temperature sensor unit. That is, it can be said that, when used as the temperature-sensing units 6, 8, the thermistor unit and the resistance temperature sensor unit where the temperature-sensing element is disposed to be displaced toward the capillary tube are superior in the S/N and the response to the diode unit where the temperature-sensing element is disposed in a central region of the molded resin for the purpose of protecting the temperature-sensing element.

Generally, the thermistor unit does not have a lead terminal as in the diode unit. Thus, for example, in cases where the temperature-sensing units 6, 8 using the thermistor unit, and the capillary tube 2 are fixed to a board to make up the thermal mass flowmeter, the thermistor unit has an advantage of being able to avoid an undesirable situation where a lead terminal of the temperature-sensing unit soldered to the board is bent due to movement of the board, to cause a displacement of the temperature-sensing unit from a desired position thereof relative to the capillary tube 2.

In a thermal mass flowmeter using the diode unit as the temperature-sensing units 6, 8, it is necessary to surround a measurement section including the diode unit by a thick heat insulator so as to suppress an adverse effect of an unintended temperature change in surroundings. In contrast, when the thermistor unit or the resistance temperature sensor unit superior in the S/N to the diode unit is used as the temperature-sensing units 6, 8, such a heat insulating structure can be simplified.

An S/N and a response of the heating unit can be evaluated based on a value of "b/c" and a value of "c", in the same manner as that in the temperature-sensing unit, although a thermal flow direction is opposite to that in the temperature-sensing unit. Specifically, in a heating unit having a smaller value of "c", heat generated from a heating element thereof can be readily transferred to a fluid in the capillary tube. In a heating unit having a smaller value of "b", heat generated from a heating element thereof will be easily released in directions other than a direction oriented to the capillary tube. Therefore, in the heating unit, the heating element covered by the molded resin is preferably disposed to be displaced toward the capillary tube 2.

For example, comparing a resistor unit [which is the same as the resistance temperature sensor unit (a=0.05 mm; b=0.45 mm)] with the Schottky diode unit I (a=0.26 mm; b=0.34 mm), the resistor unit is 3.5 times superior in the S/N, and 2.6 times superior in the response, to the Schottky diode unit I. Thus, the resistor unit can be used as the heating unit 4 to provide a thermal mass flowmeter which is superior in the S/N and the response to that using the diode unit. The resistor unit has a structure in which a resistive element serving as a heating element is covered by a protective resin molded around the heating element.

An advantageous embodiment of the invention has been shown and described. It is obvious to those skilled in the art that various changes and modifications may be made therein without departing from the spirit and scope thereof as set forth in appended claims.

What is claimed is:

1. A thermal mass flowmeter comprising:

a heating unit disposed on an outer peripheral surface of a capillary tube for allowing a fluid to flow therethrough, said heating unit adapted to locally heat the fluid in said capillary tube through a wall of said capillary tube;

a pair of upstream-side and downstream-side temperature-sensing units each provided as a separate component from said heating unit, said upstream-side and downstream-side temperature-sensing units being disposed on the outer peripheral surface of said capillary tube on a same side as that of said heating unit and at respective positions equally distant from said heating unit toward an upstream side and a downstream side of said capillary tube; and a calculation section for calculating a flow rate of the fluid flowing through said capillary tube, based on a difference between respective sensed temperatures of said upstream-side and downstream-side temperature-sensing units, wherein each of said upstream-side and downstream-side temperature-sensing units includes a thermistor or a resistance temperature sensor which serves as a temperature-sensing element, and a protective resin covering said thermistor or said resistance temperature sensor, said thermistor or said resistance temperature sensor being surrounded by said protective resin covering such that a first portion of said protective resin covering is sandwiched between said thermistor or said resistance temperature sensor and said wall of said capillary tube and a second portion of said protective resin covering is provided such that said thermistor or said resistance temperature sensor is sandwiched between the first portion and said second portion, wherein a distance between a center of said thermistor or said resistance temperature sensor and an outer surface of said first portion that contacts said capillary tube is less than a distance between the center of said thermistor or said resistance temperature sensor and an outer surface of said second potion that is distal from said thermistor or said resistance temperature sensor.

2. The thermal mass flowmeter as defined in claim 1, wherein said heating unit includes a resistive element serving as a heating element, and a protective resin covering said resistive element, said resistive element being surrounded by said protective covering such that the heating unit is displaced toward the outer surface of said second portion, and said resistive element is closer to the outer surface of said first portion.

* * * * *